United States Patent

[11] 3,630,769

[72] Inventors Peter B. Hart; Christopher Hill; Clifford W. Wilkins, all of Ilford, Essex, England
[21] Appl. No. 817,573
[22] Filed Apr. 18, 1969
[45] Patented Dec. 28, 1971
[73] Assignee The Plessey Company Limited Ilford, Essex, England
[32] Priority Apr. 24, 1968
[33] Great Britain
[31] 19,317/68

[54] PRODUCTION OF VAPOR-DEPOSITED $NB_3SN$ CONDUCTOR MATERIAL
6 Claims, No Drawings

[52] U.S. Cl. .......... 117/227, 117/107.2 R, 148/6.3, 338/32

[51] Int. Cl. .......... C23c 11/00, C23c 11/08

[50] Field of Search .......... 117/227; 29/599; 338/32; 117/107.2 R; 148/6.3

[56] References Cited

UNITED STATES PATENTS

| | | | |
|---|---|---|---|
| 3,429,032 | 2/1969 | Martin et al. .......... | 25/599 |
| 3,436,258 | 4/1969 | Neugebauer et al. .......... | 117/227 X |

*Primary Examiner*—William L. Jarvis
*Attorney*—Scrivener Parker Scrivener and Clarke

ABSTRACT: $Nb_3Sn$ superconductor material of increased critical current density is obtained by carrying out vapor deposition by decomposition of chlorides on a heated corrosion-resistant substrate in the presence of oxygen, for example 0.5 percent oxygen, in a mixed hydrogen and argon gas stream.

PRODUCTION OF VAPOR-DEPOSITED NB B SN CONDUCTOR MATERIAL

This invention relates to the production of $Nb_3Sn$ Niobium-Tin superconductor material.

Niobium Tin of the formula $Nb_3Sn$ is a superconductor with a high critical temperature (Tc—18.3° K.), which can sustain a very high critical current density (Ic amps/cm²) before it loses its superconducting properties and becomes normal. It is thus a valuable material for the construction of superconducting solenoids, where it can be used at fields in excess of 100 k. gauss, but technological problems which arise from the brittle nature of $Nb_3Sn$ make it difficult to work the material into suitable tapes and wires.

In one existing process for the fabrication of tape with $Nb_3Sn$ layers supported by a metal substrate, $Nb_3Sn$ is deposited from the vapor onto a substrate which is a corrosion-resistant alloy having a thermal-expansion coefficient similar to that of $Nb_3Sn$, for example on the material known under the Trade Mark Hastelloy. In this vapor-deposition process the substrate is a resistively heated to 800°–1000° C., and $Nb_3Sn$ is deposited on the heated substrate by hydrogen reduction of the chlorides of niobium and tin, $NbCl_4$ and $SnCl_4$. The critical parameter of the niobium-tin deposit for use in solenoid winding is its critical current density, *Jc*, at a specified field. We have found that in general *Jc* has an optimum value in deposits formed at deposition temperatures around 800° C., and that its value will drop off in deposits formed at higher growth temperatures, while growth rates fall to impracticably low levels when the substrate temperature is much below 700° C. In deposits formed at 800° C., typical values of *Jc* are $2–3\times10^5$a./cm.² at 4.2° K. in a field of 50 k. gauss, the current measurement being made with the magnetic field vector perpendicular to the current and parallel to the tape width. Some random variations in *Jc* are observed from sample to sample, and values of *Jc* as high as $5\times10^5$a./cm.² at 50 k. gauss have been observed.

The present invention has for an object to provide an improved vapor-deposition process for $Nb_3Sn$ by which remarkably high and consistent *Jc*'s can be obtained. According to the invention, oxygen is introduced into the gas stream used in the vapor-deposition.

While beneficial results have been observed within a range of 0.05 to 5 volume percent of oxygen in the gas stream, optimum results have been achieved with an oxygen concentration of about 0.5 volume percent. The substrate temperature is preferably kept at about 800° C., although the presence of the oxygen will show beneficial results within a temperature range of about 700°to 1,100° C., and in order to avoid excessive vapor condensation on the walls of the reaction vessel, it is preferred to use vapor temperatures which are not more than 100° C., below the substrate temperature.

In one series of experiments, as the oxygen concentration in the gas stream increased from 0.02–1 percent by volume, an almost linear increase in *Jc* was obtained, from $1.8\times10^5$ to $4.2\times10^5$ a./cm.², conditions being held constant.

Transmission electron-microscope work on vapor-deposited $Nb_3Sn$ has shown that, while $Nb_3Sn$ material as hitherto prepared generally consists of well defined and relatively perfect crystallites ranging from 0.2$\mu$–0.3$\mu$ in diameter in some cases, up to 2$\mu$–3$\mu$ in others, samples grown in the presence of oxygen in accordance with the invention showed additional diffraction contrast effects within the $Nb_3Sn$ grains, fine lines and diffuse particles having been observed. It is though that precipitation of a niobium-oxygen phase is taking place that these precipitates are acting as flux-priming centers, thus increasing critical current density.

EXAMPLE

In the best result obtained so far, a 6¼$\mu$layer of $Nb_3Sn$, grown on one-fourth-inch-wide Hastelloy maintained at 800° C., carried 400 a. at 46 k. gauss, a current density of $5.1\times10^5$ a./cm.². Deposition was obtained with the flows in the gas stream, measured initially, as follows:

Hydrogen: 1,000 cc./minute
Argon: 1,350 cc./minute
$NbCl_4$: 125 cc./minute
$SnCl_4$: 45 cc./minute
Oxygen: 12½ cc./minute

What we claim is:

1. A method of depositing niobium-tin superconductor material on a substrate, which comprises heating the substrate to a temperature not substantially below 700° C., and not substantially higher than 1,000° C. and passing over the thus heated substrate a stream of gas including niobium chloride in the vapor state, tin chloride in the vapor state, hydrogen, and between 0.05 volume percent and 5 volume of oxygen.

2. A method as claimed in claim 1, wherein deposition is effected from a gas stream which contains 0.4 to 0.6 volume percent of oxygen.

3. A method as claimed in claim 2, wherein deposition is effected with the substrate maintained at approximately 800°C.

4. A method as claimed in claim 1, wherein the temperature of the gas stream is maintained above a minimum level that is 100°C. below the temperature of the substrate.

5. A method as claimed in claim 4, wherein deposition is effected with the substrate maintained at approximately 800°C.

6. A method as claimed in claim 5, wherein deposition is effected from a gas stream comprising approximately 39½ volume percent of hydrogen, 53 volume percent of argon, 5 volume percent of niobium chloride $NbCl_4$, 2 volume percent of tin chloride $SnCl_4$, and one-half volume percent of oxygen.

* * * * *